United States Patent [19]

Fukura et al.

[11] 3,912,414

[45] Oct. 14, 1975

[54] CEMENTED CARBIDE TWIST DRILL

[75] Inventors: Hiroshi Fukura; Sinzi Saimyo, both of Itami, Japan

[73] Assignee: Sumitomo Electric Industries, Ltd., Osaka, Japan

[22] Filed: June 7, 1973

[21] Appl. No.: 367,897

[30] Foreign Application Priority Data

June 9, 1972   Japan................................ 47-67290

[52] U.S. Cl................................. 408/144; 408/230
[51] Int. Cl............................................. B23b 51/02
[58] Field of Search ............ 408/144, 713, 226, 59, 408/230

[56] References Cited
UNITED STATES PATENTS

| | | | |
|---|---|---|---|
| 719,860 | 2/1903 | Platt et al. | 408/713 X |
| 941,568 | 11/1909 | Fleming | 408/59 |
| 1,847,302 | 3/1932 | Emmons | 408/144 |
| 2,739,496 | 3/1956 | Fleischer | 408/59 X |
| 3,548,688 | 12/1970 | Kuch | 408/230 |

FOREIGN PATENTS OR APPLICATIONS

| | | | |
|---|---|---|---|
| 54,254 | 2/1912 | Austria | 408/226 |

*Primary Examiner*—J. M. Meister
*Assistant Examiner*—Z. R. Bilinsky

[57] ABSTRACT

A cemented carbide twist drill comprising a twist drill body having alternate spiral grooves, lands and reliefs in the periphery and a cemented carbide tip of a predetermined length connected to the body and having alternate spiral grooves, lands and reliefs which form the extensions of the corresponding grooves, lands and reliefs of the body, respectively.

4 Claims, 6 Drawing Figures

3,912,414

CEMENTED CARBIDE TWIST DRILL

BACKGROUND OF THE INVENTION

This invention relates to a twist drill and more particularly, to a double-toothed cemented carbide twist drill comprising a steel twist drill body and a cemented carbide tip of a predetermined length connected to one end of the body so as to form the cutting edge of the drill.

There have been proposed a great variety of cemented carbide twist drills and one most common type of such conventional drills comprises a steel twist drill body and a cemented carbide tip brazed together at their opposite flat connection faces. However, in such a conventional cemented carbide twist drill, the brazing layer connecting the opposite connection faces of the drill body and tip together is easily abraded by generated chips and thus, the connection between the drill body and tip formed by such a brazing layer has not sufficiently durable.

SUMMARY OF THE INVENTION

Therefore, the principal object of the present invention is to provide a cemented carbide twist drill which comprises a steel twist drill body and a cemented carbide tip firmly connected together against separation or breakage and which can effectively eliminate the disadvantages inherent in the prior art cemented carbide twist drills.

Another object of the present invention is to provide a cemented carbide twist drill which comprises a steel twist drill body and a cemented carbide tip connected together by a brazing layer which resists abrasion effect from generated chips.

The above objects of the present invention can be attained by the provision of a V-section groove at the connection face of the cemented carbide tip and a mating V-section projection at the connection face of the steel twist drill body, respectively.

BRIEF DESCRIPTION OF THE DRAWING

The above and other objects and attendant advantages of the present invention will be more apparent to those skilled in the art from a reading of the following detailed description in conjunction with the accompanying drawing wherein.

PREFERRED EMBODIMENT OF THE INVENTION

Figure 3:
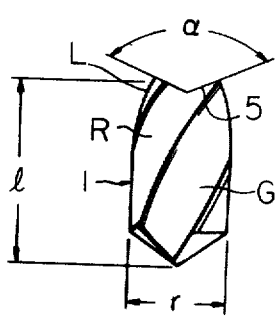
FIG. 3 is a side elevational view of portion of a preferred form of cemented carbide twist drill tip according to the present invention.
Figure 4:
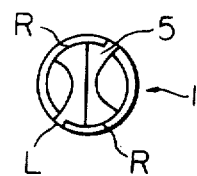
FIG. 4 is an end elevational view of said tip of FIG. 3.

Referring to FIGS. 3 and 4 of the accompanying drawing, there is shown a preferred form of cemented carbide tip 1 suitably employed in conjunction with a preferred form of carbide twist drill of the invention. The cemented carbide tip 1 has a cross-sectional configuration similar to that of the body of a conventional twist drill and is provided in its periphery with two spiral grooves G which are angularly spaced from each other by 180° and lands L and relieved periphery R positioned between the spiral grooves. In the illustrated embodiment, the tip has the length $l$ on the order of 1 ~ 5 times the diameter $r$. One end face of the tip 1 where the tip is to be connected to the body 2 of a carbide twist drill which has the same spiral lead as the tip is provided with a V-section groove extending diametrically across the tip from one relieved periphery R to the diametrically opposite periphery R. The opposite faces defining the V-section groove converge toward the apex of the V at an intersecting angle $\alpha$ preferably within the range 120° ~ 150° so as to provide a V-section female connection face 5.

Figure 5:
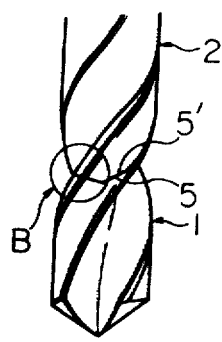
FIG. 5 is a side elevational view of a preferred form of carbide twist drill having said cemented carbide tip of FIGS. 3 and 4 connected thereto according to the present invention.

In FIG. 5, one end face of the steel drill body 2 to which the grooved connection face 5 of the cemented carbide tip 1 is to be connected is shown as being provided with a V-section projection corresponding to the V-section connection face 5 at the adjacent end of the tip 1 with the opposite faces which define the V-section projection converging toward the apex of the V at the same intersection angle $\alpha$ as that of the faces which define the V-section groove so as to provide a male connection face 5' to be received in the mating grooved connection face 5. The tip 1 and drill body 2 are brazed together at the connection faces 5 and 5' with the grooves G, land L and relieved periphery R of the tip in alignment with the corresponding parts of the drill body and the thickness of the brazing layer between the connection faces 5 and 5' is preferably within the range 0.01 ~ 0.2 mm. When the tip and drill body 1 and 2 are connected in the manner mentioned above, the spiral grooves G and land L of the tip form the extensions of the corresponding parts of the drill body, respectively.

Figure 6:
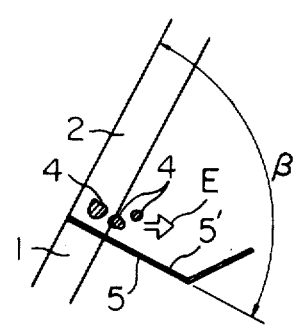
FIG. 6 is a fragmentary view on an enlarged scale of the area of said twist drill of FIG. 4 indicated by B therein as seen on one relieved periphery of the drill showing a flow state of chips as the chips intervene between relieved periphery of the drill and wall surface of drilled hole by the use of the drill.

When the carbide twist drill which comprises the drill body 2 having the cemented carbide tip 2 connected thereto is rotated in the arrow D direction as seen in FIG. 5 for a particular drilling operation, generated chips 4 are moved from between a work piece (not shown) and the relieved peripheries R of the twist drill along the relieved peripheries in the arrow E direction as seen in FIG. 6. However, since the connection between the tip and drill body 1 and 2 presents a V-shaped configuration as seen on the relieved periphery sides, the chips 4 move along the relieved periphery R without abrasion action thereby to substantially reduce the possibility of abrasion action on the brazing layer by the moving chips 4. And since the connection faces of the tip and drill body are formed in the mating female groove and male projection arrangement so that the drill body is not mechanically allowed to turn relative to the tip, the connection between the tip and drill body is sufficiently strong to resist twisting-apart of the tip from the drill body.

Furthermore, since the angle β in FIG. 6 defined by one of the faces defining the connection face 5' and the front side of the spiral grooves of the drill body 2 is about 90° or more, the corner portion of the steel body has a great heat capacity whereby local oxidation of the steel body at this corner due to the brazing can be substantially reduced to assure a proper brazing strength. On the other hand, when the connection face of the cemented carbide tip is provided by a V-section projection and the connection face of the drill body is provided by a V-section groove, each similar but contrary to that provided in the tip and drill body as shown in FIG. 5, respectively, and the tip and drill body are brazed together at their connection faces, then, the angle β will be an acute one and oxidation of the steel body at this pointed corner due to the local overheating when the tip and drill body are brazed together will be substantial resulting in reduction of the strength of the drill.

Figure 1:
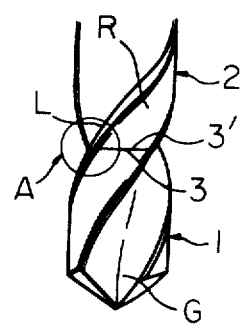
FIG. 1 is a side elevational view of portion of a conventional carbide twist drill having a cemented carbide tip connected thereto.
Figure 2:
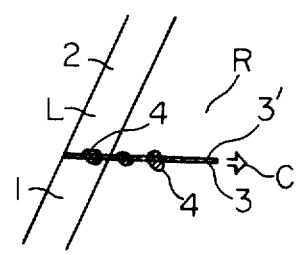
FIG. 2 is a fragmentary view on an enlarged scale of the area of said twist drill of FIG. 1 indicated by A therein as seen on one relieved periphery of the drill showing a flow state of chips as the chips intervene between relieved periphery of the drill and wall surface of drilled hole by the use of the drill.

Turning to FIGS. 1 and 2, there is shown a typical conventional carbide twist drill which comprises a steel twist drill body 2 and a cemented carbide tip 1 brazed together at their opposite flat connection faces 3' and 3. When a drilling operation is performed by the use of the conventional cemented carbide twist drill, a part of generated fine chips 4 moves from between the spiral edge of the drill and the wall of the holes drilled in a work piece (not shown) along the connection between the drill body and tip in the relieved periphery R in the arrow C direction as shown in FIG. 2 as the drill rorates and therefore, the brazing layer between the connection faces in the relieved periphery R is abraded by the chips. And since the connection faces 3 and 3' of the tip 1 and drill body 2 are flat, the connection between the tip and drill body has not a structural engagement to resist relative rotation and, therefore, the connecting strength of such a drill will be smaller than that of the drill of the present invention.

The cemented carbide twist drill of FIG. 1 and the cemented carbide twist drill of FIG. 5 were operated for drilling holes in gray cast iron respectively. In each drilling operation, the test piece was drilled 400 holes each having the depth of 50 mm (the total drilling length amounted to 20 m). After each hole drilling, the condition of the brazing layer in the connection between the drill body and tip was observed. In the conventional drill, the brazing layer was substantially abraded by chips and 0.2 mm ~ 0.3 mm deep crevices were formed in the outer surface at the lands and their vicinities in the connection between the tip and drill body. On the other hand, the brazing layer in the cemented carbide twist drill of the invention was not substantially abraded by chips.

It is to be understood that while the above has been indicated as a preferred embodiment, numerous variations or modifications therein may occur to those having skill in this art and what is intended to covered herein is not only the illustrated form of the invention, but also any and all modified forms thereof as may come within the spirit of said invention.

We claim:

1. A cemented carbide twist drill comprising a steel twist drill body having two spiral grooves in 180° angular spaced relationship and lands and relieved peripheries between said spiral grooves in the periphery extending in the length of said drill, and a cemented carbide tip connected to the forward end of said body, the tip having corresponding spiral grooves, lands and relieved peripheries respectively continuing those of the drill body, said drill body and tip being connected together between a V-section projection of said body defined by two planar converging faces diametrically extending across the diameter of said drill from one relieved periphery to the other relieved periphery and a mating V-section groove of said carbide tip defined by two planar converging faces diametrically extending across the diameter of said tip from one relieved periphery to the other relieved periphery at one end of the tip opposite to said projection of the drill body.

2. The cemented carbide twist drill as set forth in claim 1, in which the intersecting angle between said converging faces which define said V-section projection and V-section groove, respectively, is within the range 120° ~ 150°.

3. The cemented carbide twist drill as set forth in claim 1, in which said cemented carbide tip has a length within the range of 1 ~ 5 times the diameter.

4. The cemented carbide twist drill as set forth in claim 2, in which said cemented carbide tip has a length within the range of 1 ~ 5 times the diameter.

* * * * *